United States Patent
Zhang et al.

(10) Patent No.: US 10,104,225 B2
(45) Date of Patent: *Oct. 16, 2018

(54) COMMUNICATION SYSTEM AND COMMUNICATION METHOD

(71) Applicant: SoftBank Corp., Tokyo (JP)

(72) Inventors: Liang Zhang, Tokyo (JP); Takao Okamawari, Tokyo (JP); Teruya Fujii, Tokyo (JP)

(73) Assignee: Softbank Corp., Tokyo (JP)

( * ) Notice: Subject to any disclaimer, the term of this patent is extended or adjusted under 35 U.S.C. 154(b) by 114 days.

This patent is subject to a terminal disclaimer.

(21) Appl. No.: 15/126,026

(22) PCT Filed: Apr. 2, 2014

(86) PCT No.: PCT/JP2014/059754
§ 371 (c)(1),
(2) Date: Sep. 14, 2016

(87) PCT Pub. No.: WO2015/151248
PCT Pub. Date: Oct. 8, 2015

(65) Prior Publication Data
US 2017/0094052 A1 Mar. 30, 2017

(51) Int. Cl.
*H04W 24/00* (2009.01)
*H04M 3/22* (2006.01)
(Continued)

(52) U.S. Cl.
CPC .......... *H04M 3/2236* (2013.01); *H04M 1/24* (2013.01); *H04M 3/2227* (2013.01); *H04M 3/26* (2013.01); *H04M 2207/18* (2013.01)

(58) Field of Classification Search
None
See application file for complete search history.

(56) References Cited

U.S. PATENT DOCUMENTS 8,391,872 B1 * 3/2013 Shetty ................... H04W 36/30
370/331
2006/0093094 A1 5/2006 Xing et al.
(Continued)

FOREIGN PATENT DOCUMENTS

| JP | 62-128636 A | 6/1987 |
| JP | 2006-115498 A | 4/2006 |
| JP | 2008-532416 A | 8/2008 |

OTHER PUBLICATIONS

International Telecommunication Union, Series P: Telephone Transmission Quality, Telephone Installations, Localline Networks, Methods for objective and subjective assessment of quality, ITU-T Recommendation P .862, Feb. 2001.
(Continued)

*Primary Examiner* — Suhail Khan
(74) *Attorney, Agent, or Firm* — Muirhead and Saturnelli, LLC

(57) ABSTRACT

Communication systems and communication methods capable of evaluating a voice quality in a voice communication of a communication network and a presence or absence of a call drop of the voice communication are provided. A voice communication of transceiving a test signal for voice communication quality evaluation between a communication terminal apparatus 100 and a voice communication evaluation system 400 via the communication network 300 is performed. A voice quality evaluation value is calculated based on the test signal before transmission and the test signal after reception in the voice communication. A presence or absence of a call drop of the voice communication is determined based on a presence or absence of reception interruption of the test signal.

19 Claims, 7 Drawing Sheets

(51) Int. Cl.
*H04M 1/24* (2006.01)
*H04M 3/26* (2006.01)

(56) References Cited

U.S. PATENT DOCUMENTS

2006/0199548 A1    9/2006  Saraby
2013/0143602 A1*   6/2013  Rodriguez .......... H04M 3/2236
                                              455/456.5

OTHER PUBLICATIONS

International Telecommunication Union, Series P: Terminals and Subjective and Objective Assessment Methods, Methods for objective and subjective assessment of speech quality, ITU-T Recommendation P .863, Jan. 2011.
NTT Advanced Technology Corp., Network Technology Center, Yasashii NGN/IP Network Gijutsubako, 1st edition, The Telecommunications Association, Jun. 1, 2009, pp. 329-331.
Chika Aoshima, et al., "A Study of Artificial Voices for Telephonometry in the IP-based Telecommunication Networks," Proc. of 2010 IEICE General Conference.

\* cited by examiner

COMMUNICATION SYSTEM AND COMMUNICATION METHOD

TECHNICAL FIELD

The present invention relates to communication methods and communication systems capable of evaluating a quality of voice communication, etc. via a communication network.

BACKGROUND ART

A quality of voice transceived via a communication network is affected by various factors such as environmental noise and an utterance level during utterance, performance of voice input and voice process at a voice transmitting side, a transmission quality, performance of voice output and voice process at a voice receiving side, environmental noise and a voice receiving level during reception, etc. Conventionally, a communication system of measuring the above-mentioned quality of voice is known, which is provided with a mobile telephone that is functioned as a communication terminal apparatus dedicated for measurements and in which a sound source file and an application for measurements of voice quality are implemented in advance, and a server for measurements of voice quality that is connected to a fixed-telephone communication network and in which a sound source file for measurements of voice quality are implemented in advance. In this communication system, a specialized staff responsible for measurements of voice quality operates the foregoing mobile telephone dedicated for measurements so as to perform an outgoing call to the server and notifies of a request to measure a voice quality. When receiving the request from the mobile telephone, the sever generates a voice signal based on the sound source file and transmits the generated voice signal to a communication terminal apparatus via the fixed-telephone communication network and a mobile telephone network. In the communication terminal apparatus, the voice signal received from the server is recorded and stored as a recorded audio file and a voice quality is measured by compared a voice signal of the recorded audio file with a voice signal of the sound source file. A measurement result of the voice quality is outputted, for example, as a MOS (Mean Opinion Scores) value standardized in Non-Patent Literature 1, Non-Patent Literature 2 and the like. The MOS value is a computed value corresponding to an average value of scores on five-grade evaluation (refer to Table 1) by a large number of persons based on comparison results between a voice to be evaluated and a voice of a reference sound source. In Non-Patent Literature 1 and Non-Patent Literature 2, an international standard method of mechanically realizing the foregoing computation of MOS values is described.

TABLE 1

| Score | Quality |
|---|---|
| 5 | Excellent |
| 4 | Good |
| 3 | Fair |
| 2 | Poor |
| 1 | Bad |

CITATION LIST

Non-Patent Literature

Non-Patent Literature 1: "Perceptual evaluation of speech quality (PESQ): An objective method for end-to-end speech quality assessment of narrow-band telephone networks and speech codecs", SERIES P: TELEPHONE TRANSMISSION QUALITY, TELEPHONE INSTALLATIONS, LOCAL LINE NETWORKS, Methods for objective and subjective assessment of quality, TELECOMMUNICATION STANDARDIZATION SECTOR OF ITU, ITU-T Recommendation P.862 (02/2001).

Non-Patent Literature 2: "Perceptual objective listening quality assessment", SERIES P: ERMINALS AND SUBJECTIVE AND OBJECTIVE ASSESSMENT METHODS, Methods for objective and subjective assessment of speech quality, TELECOMMUNICATION STANDARDIZATION SECTOR OF ITU, ITU-T Recommendation P.863 (01/2011).

SUMMARY OF INVENTION

Technical Problem

In foregoing voice communication via a communication network, there may be cases in which a call drop of voice communication occurs due to causes of communication network side such as a movement of a communication terminal apparatus out of a service area, a decrease in radio wave strength of radio communication used for voice communication, a congestion, etc. However, the foregoing conventional communication system of measuring voice quality is not capable of evaluating a presence or absence of such call drop of voice communication.

The present invention has been made in view of the above-described problem and an objective is to provide communication systems and communication methods, which are capable of evaluating a voice quality and a presence or absence of a call drop of voice communication of a communication network.

Solution to Problem

A communication system according to an aspect of the present invention is a communication system that comprises a communication terminal apparatus and a voice communication quality evaluation system capable of communicating with the communication terminal apparatus via a communication network. The communication system comprises means of performing a voice communication for transceiving a test signal for voice communication quality evaluation between the communication terminal apparatus and the voice communication evaluation system via the communication network, and means of calculating a voice quality evaluation value based on a test signal before transmission and a test signal after reception in the voice communication, and means of determining a presence or absence of a call drop of voice communication based on a presence or absence of a reception interruption of the test signal.

In this communication system, when performing a voice communication for transceiving the test signal for voice communication quality evaluation between the communication terminal apparatus and the voice communication evaluation system via the communication network, a voice quality evaluation value is calculated based on the test signal before transmission and the test signal after reception in the voice communication. Furthermore, the presence or absence of the call drop of voice communication is determined based on a presence or absence of a reception interruption of the test signal. In this way, by transceiving the test signal between the communication terminal apparatus and the voice com- munication evaluation system via the communication network, it is capable of evaluating the presence or absence of call drop of voice communication as well as the voice quality in the communication network.

In the foregoing communication system, the voice communication evaluation system may transmit the test signal to the communication terminal apparatus via the communication network, the communication terminal apparatus may receive and record the test signal from the voice communication evaluation system via the communication network, and the voice communication evaluation system or the communication terminal apparatus may calculate a voice quality evaluation value by making a comparison between the signal before transmission and the recorded test signal and may determine a presence or absence of a call drop of voice communication based on a presence or absence of a reception interruption of the test signal.

In this communication system, it is capable of evaluating a presence or absence of a call drop of voice communication as well as the voice quality with regard to a voice communication in a downlink direction of the communication network.

In the foregoing communication system, the foregoing communication terminal apparatus may transmit the test signal to the voice communication evaluation system via the communication network, the voice communication evaluation system may receive and record the test signal from the communication terminal apparatus via the communication network, and the voice communication evaluation system or the communication terminal apparatus may calculate a voice quality evaluation value by making a comparison between the test signal before transmission and the recorded test signal and may determine a presence or absence of a call drop of voice communication based on a presence or absence of a reception interruption of the test signal.

In this communication system, it is capable of evaluating a presence or absence of a call drop of voice communication as well as the voice quality with regard to a voice communication in an uplink direction of the communication network.

In the foregoing communication system, it may be further provided with means of downloading contents from a contents providing server subject to no communication interruption for the test signal in the communication terminal apparatus.

In this communication system, since contents can be downloaded from the contents providing server subject to no communication interruption for the test signal in the communication terminal apparatus, an incentive of a user of the communication terminal apparatus to cooperate positively on the voice communication quality evaluation can be enhanced.

In the foregoing communication system, the test signal may have an end discriminating signal at a tail end thereof and the presence or absence of the call drop of voice communication may be determined based on a presence or absence of the end discriminating signal in the test signal.

In this communication system, since a call drop of voice communication can be determined based on a presence or absence of the end discriminating signal in the test signal, the length of the test signal can be arbitrarily set and a voice call communication can be evaluated under the same condition as an actual voice call.

In the foregoing communication system, the voice communication with the test signal may be performed based on a predetermined voice communication evaluation condition.

In this communication system, since the voice communication with the test signal is performed based on the predetermined voice communication evaluation condition, it is capable of evaluating the voice communication without requesting any special operation for the voice communication evaluation to a user of the communication terminal apparatus and without causing the user of voice communication to be conscious of the voice communication evaluation.

Herein, in the foregoing communication system, it may be further provided with means of delivering the voice communication evaluation condition to the communication terminal apparatus and the voice communication evaluation system, and the communication terminal apparatus and the voice communication evaluation system may perform the voice communication of the test signal when the voice communication evaluation condition is satisfied.

In this communication system, a timing of starting the voice communication of the test signal between the communication terminal apparatus and the voice communication evaluation system can be controlled easily.

Furthermore, in the foregoing communication system, the voice communication evaluation system may further comprise means of changing the voice communication evaluation condition.

In this communication system, a timing of starting the voice communication of the test signal between the communication terminal apparatus and the voice communication evaluation system can be changed based on various kinds of information.

In the foregoing communication system, the evaluation result of voice communication including the voice communication evaluation value and the determination result of call drop, and additional information relating to at least one of the communication terminal apparatus, the communication network and the voice communication evaluation may be memorized by being associated with each other.

In this communication system, it is capable of performing a statistical processing and/or an analysis of the result of voice communication evaluation including the evaluation value of voice quality and the determination result of call drop of voice communication based on the various kinds of additional information.

Moreover, in the foregoing communication system, the test signal transceived between the communication terminal apparatus and the voice communication evaluation system may be selected from two or more types of test signals set in advance.

In this communication system, since an appropriate test signal can be selected from the two or more types of test signals in accordance with each of various situations, the voice communication can be evaluated under the same condition as a case of actual voice communication.

Herein, in the foregoing communication system, the test signal transceived between the communication terminal apparatus and the voice communication evaluation system may be selected from the two or more types of test signals, based on at least one of terminal identification information of the communication terminal apparatus, a communication history of the communication terminal apparatus, a model of the communication terminal apparatus, a current location of the communication terminal apparatus, a time period, a moving speed of the communication terminal apparatus, communication-carrier information of the communication network, and communication information in the communication terminal apparatus.

In this communication system, since an appropriate test signal can be selected from the two or more types of test signals based on various kinds of information such as the communication history easily affecting a voice communication, it is capable of evaluating a voice communication under a condition nearer to the condition in a case of actual voice communication.

In the foregoing communication system, the test signal may be a signal with a voiced period including a voice signal used for evaluating a voice communication quality and a silent period.

In this communication system, since a test signal having a length similar to a length in a case of actual voice communication can be set by adjusting the length of the silent period, it is capable of evaluating a voice communication under a condition nearer to the condition in a case of actual voice communication.

In the foregoing communication system, the communication terminal apparatus may further comprise display means of displaying by switching a display contents in accordance with the silent period and the voiced period in the test signal when receiving the test signal.

In this communication system, an appropriate kind of information corresponding to each of the silent period and the voiced period in the test signal can be notified to a user of the communication terminal apparatus by displaying the information.

A communication method according to another aspect of the present invention is a communication method capable of evaluating a quality of voice communication that includes performing a voice communication of transceiving a test signal for voice communication quality evaluation between a communication terminal apparatus and a voice communication evaluation system via a communication network, calculating a voice quality evaluation value based on the test signal before transmission and the signal after reception in the voice communication, and determining a presence or absence of a call drop of voice communication based on a presence or absence of a reception interruption of the test signal.

In this communication method, when performing the voice communication of transceiving the test signal for voice communication quality evaluation between the communication terminal apparatus and the voice communication evaluation system via the communication network, the voice quality evaluation value is calculated based on the test signal before transmission and the signal after reception in the voice communication. Furthermore, a presence or absence of a call drop of voice communication is determined based on a presence or absence of a reception interruption of the test signal. In this way, by transceiving the test signal between the communication terminal apparatus and the voice communication evaluation system via the communication network, it is capable of evaluating a presence or absence of a call drop of voice communication as well as the voice quality in the communication network.

Advantageous Effects of Invention

According to the present invention, it is capable of evaluating a voice quality and a presence or absence of a call drop of voice communication of a communication network.

DESCRIPTION OF EMBODIMENTS

Hereinafter, embodiments of the present invention will be described with reference to the drawings.

Figure 1:
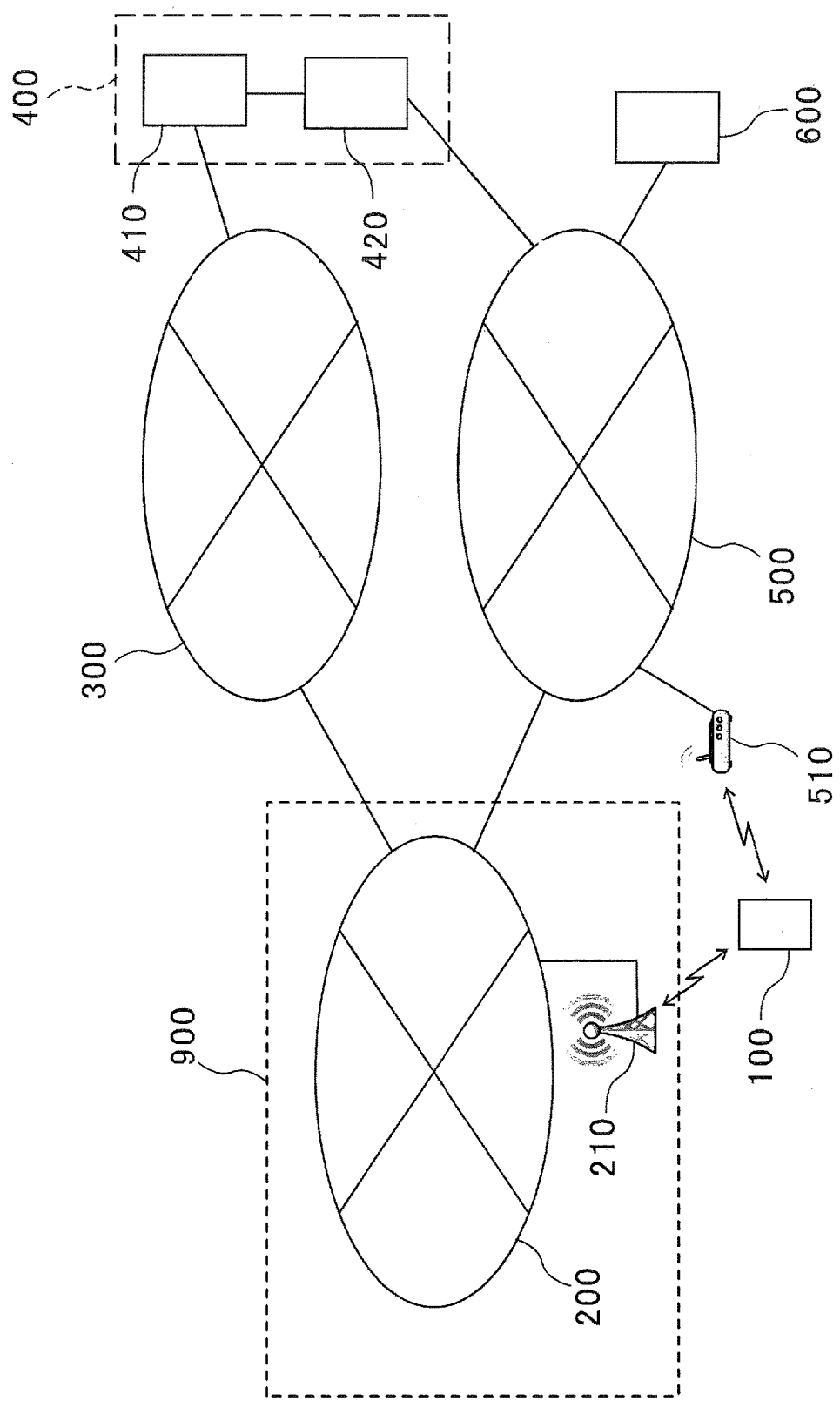
FIG. 1 is a schematic diagram showing one example of main configuration of an overall communication system according to an embodiment of the present invention.

FIG. 1 is a schematic diagram showing one example of main configuration of an overall communication system according to an embodiment of the present invention. The communication system of this present embodiment includes a communication terminal apparatus 100 capable of being used by a user, and a voice communication evaluation system 400 of performing a process relating to evaluation for a voice communication by using the communication terminal apparatus 100 via a mobile communication network (mobile telephone network) 200. The voice communication evaluation system 400 is provided with an automatic voice response apparatus 410 and an analysis server 420. The communication terminal apparatus 100 is capable of performing a voice communication with the automatic voice response apparatus 410 of the voice communication evaluation system 400 via the mobile communication network 200 including a base station 210 and via a fixed-telephone network 300. Furthermore, the communication terminal apparatus 100 is capable of accessing the Internet 500 via the foregoing mobile communication network 200 including the base station 210 or via a access-point apparatus 510 of wireless LAN such as WiFi (Wireless Fidelity) and so on, transceiving various data to and from a analysis server 420 of the voice communication evaluation system 400 and/or downloading contents such as music and so on from a contents providing server 600.

The communication terminal apparatus 100 is, for example, a tablet PC or a mobile communication terminal capable of performing voice communication such as a mobile telephone, a smartphone, a PHS or the like, and capable of performing a voice communication and/or a data communication with a communication destination via the mobile communication network 200 including a base station being as a wireless relaying apparatus that is not shown, switching equipment or the like. For example, when existing in a cell being as a wireless communication area of the mobile communication network 200, the communication terminal apparatus 100 is capable of performing a voice communication with a communication terminal apparatus such as a tablet PC, a mobile communication terminal such as a mobile telephone, a smartphone, a PHS, etc. or the like which exists in a cell of other mobile communication network and is connected thereto. Further, when exiting in a cell of the mobile communication network 200, the communication terminal apparatus 100 is capable of performing a voice communication with the automatic voice response apparatus 410 as being as a voice communication destination of the voice communication evaluation system 400 via a fixed-telephone network 300 and/or performing a data communication and voice communication with the analysis server 420 of the voice communication evaluation system 400 via the Internet 500. The foregoing cell is, for example, any one of various cells that are different in size between themselves, such as macro cell, a micro cell, a femto cell, a pico cell or the like.

The automatic voice response apparatus 410 is configured to be capable of bi-directionally communicating with each of the analysis server 420 and the communication terminal apparatus 100. The automatic voice response apparatus 410 is an apparatus that performs an automatic voice response and an automatic voice reception in response to an outgoing call from the communication terminal apparatus 100 and so on. For example, the automatic voice response apparatus 410 transmits a test signal for voice communication quality evaluation described below to the communication terminal apparatus 100 in response to an outgoing call from the communication terminal apparatus 100, and receive a test signal for voice communication quality evaluation when receiving an outgoing call from the communication terminal apparatus 100.

The analysis server 420 is configured to communicate with each of the automatic voice response apparatus 410 and communication terminal apparatus 100. The analysis server 420 is a server that performs various processes relating to the voice communication evaluation. For example, the analysis server 420 calculates a MOS value (refer to Non-Patent Literatures 1 and 2) as being an evaluation value of voice quality, and/or determines a call drop of voice communication via the mobile communication network 200. Moreover, the analysis server 420 is capable of storing and managing sound source files of test signals for voice communication quality evaluation, information on evaluation values of voice quality and determination results of call drop of voice communication, and the like, and/or performing various statistical processes and analyzing processes with respect to the information.

The communication terminal apparatus 100 is configured with, for example, a radio signal processing section including an antenna, a transmitting amplifier, a receiving amplifier, a radio signal processing section, a baseband signal processing section, an application execution management section, a voice input device including a small-size microphone, a voice output device including a speaker, a receiver, a vibration generator or the like, a display section such as a LCD as being display means, a main controller and so on. Furthermore, the communication terminal apparatus 100 includes a GPS receiving section that acquires information on its own current location by using the GPS (Global Positioning System), as being current location acquiring means. The communication terminal apparatus 100 may include an imaging section configured with a camera device such as a CCD, a CMOS device or the like, and an attitude detecting section configured with a gyro sensor, an acceleration sensor, a magnetic sensor or the like.

The main controller is configured with, for example, a microprocessor such as an MPU (Micro Processing Unit) and memories such as a RAM, a ROM etc., and controls respective sections based on a predetermined control program implemented in advance. For example, by executing the predetermined control program, the main controller is capable of performing a processing of a voice communication with the automatic voice response apparatus 410 via the mobile communication network 200 and the fixed-telephone network 300 and a control of the same process, performing a process of transmitting and receiving of the recorded audio file of test signal and the result of voice communication evaluation to and from the analysis server 420 via the mobile communication network 200 and the Internet 500 and a control of the same process, performing a download of contents such as music form the contents providing server 600 and a control thereof, and performing a process of evaluating of the voice communication (a process of calculating the voice quality evaluation value, a process of determining a presence or absence of a call drop) or the like.

Moreover, the communication terminal apparatus 100 is capable of executing various application programs on a native environment of the main controller and/or executing various application programs on a virtual environment established by the application executing management section. In the description herein, the "application" (hereinafter abbreviated as "app" as appropriate) means a software capable of being applied to each of various uses such as a telephone, recording, browser, camera, retrieval, mail, information delivery, calendar, clock, music playback, map display, data folder, message communication, video playback and so on as well as a voice communication evaluation processing, and is also called "application software". The "application" is an aggregation of files of executive programs developed with various computer languages and files of setting information, image, etc. that are used and/or referred when executing the program or in other timing.

The application execution management section manages, for example, program modules and libraries that are used for executing the applications. Moreover, the application execution management section establishes a framework (for example, an Android framework, an iOS framework, etc.) or a virtual execution environment such as a Dalvik (registered trademark) VM, a Java VM, etc., which are used for any one, two or more than two of plural kinds of applications such as an Android (registered trademark) application, an iOS (registered trademark) application, a Windows (registered trademark) application, a Java (registered trademark) application and so on. The application execution management section is configured to have a multitasking function so as to execute a plurality of applications in parallel.

Each of the automatic voice response apparatus 410 and analysis server 420 is configured, for example, by using hardwares such as a computer apparatus having an MPU, memories, etc., an external communication interface apparatus, etc. and is capable of performing various processes for voice communication evaluation by executing a predetermined program.

In one example of voice communication evaluation in a downlink direction of the present embodiment, the main controller of the communication terminal apparatus 100 may also function as recording means of recording a predetermined test signal used for voice communication evaluation and storing as a recorded audio file.

Furthermore, the main controller, antenna, transmitting amplifier, receiving amplifier, radio signal processing section, baseband signal processing section, and so on of the communication terminal apparatus 100 may also function as being each of means such as outgoing call means of performing an outgoing call of voice communication to the automatic voice response apparatus 410 of the voice communication evaluation system 400 via the networks 200 and 300 based on a predetermined schedule set in advance, test signal receiving means of receiving a test signal transmitted from the automatic voice response apparatus 410 of the voice communication evaluation system 400 via the networks 200 and 300, recorded audio file transmitting means of transmitting the recorded audio file to the analysis server 420 of the voice communication evaluation system 400, and the like.

Moreover, the main controller, antenna, transmitting amplifier, receiving amplifier, radio signal processing section, baseband signal processing section, and so on of the communication terminal apparatus 100 may also function as download means of downloading contents such as music, etc. from the contents providing server 600.

Further, the computer apparatus and external communication interface apparatus of the automatic voice response apparatus 410 may also function as being each of means such as sound source file memory means of memorizing a sound source file of the forgoing predetermined test signal, test signal transmitting means of transmitting the test signal of the sound source file to the communication terminal apparatus 100 via the networks 200 and 300 in response to an outgoing call from the communication terminal apparatus 100, and the like.

Furthermore, the computer apparatus and external communication interface apparatus of the analysis server 420 may also function as being each of means such as recorded audio file receiving means of receiving from the communication terminal apparatus 100 a recorded audio file of the test signal received by the communication terminal apparatus 100, calculating means of calculating an evaluation value of voice quality by comparing the voice signal during a voiced period of the test signal of the sound source file with the voice signal during a voiced period of the recorded audio file, determining means of determining a presence or absence of a call drop of voice communication based on a presence or absence of a disconnection of communication in the test signal of the recorded audio file, evaluation result memory means of memorizing an evaluation result of voice communication including the evaluation value of voice quality and a determination result of call drop, and the like.

In another example of voice communication evaluation in a downlink direction of the present embodiment, the main controller of the communication terminal apparatus 100 may also function as being each of means such as sound source file memory means of memorizing a sound source file of the forgoing predetermined test signal, recording means of recording the test signal received from the automatic voice response apparatus 410 and storing as a recorded audio file, calculating means of calculating an evaluation value of voice quality by comparing the voice signal during a voiced period of the test signal in the sound source file with the voice signal during a voiced period in the recorded audio file, determining means of determining a presence or absence of a call drop of voice communication based on a presence or absence of a disconnection of communication in the test signal of the recorded audio file.

Furthermore, the main controller, antenna, transmitting amplifier, receiving amplifier, radio signal processing section, baseband signal processing section, and so on of the communication terminal apparatus 100 may also function as being each of means such as test signal receiving means of receiving a test signal transmitted from the automatic voice response apparatus 410 via the networks 200 and 300, evaluation result transmitting means of transmitting the evaluation result of voice communication including the forgoing evaluation value of voice quality and a determination result of call drop to the voice communication evaluation system 400.

Moreover, the main controller, antenna, transmitting amplifier, receiving amplifier, radio signal processing section, baseband signal processing section, and so on of the communication terminal apparatus 100 may also function as means of downloading contents such as music, etc. from the contents providing server 600.

Further, the computer apparatus and external communication interface apparatus of the automatic voice response apparatus 410 may also function as being each of means such as sound source file memory means of memorizing a sound source file of the forgoing predetermined test signal for using evaluation of voice quality, and test signal transmitting means of transmitting a test signal of the sound source file to the communication terminal apparatus 100 via the networks 200 and 300.

Furthermore, the computer apparatus and external communication interface apparatus of the analysis server 420 may also function as evaluation result receiving means of receiving from the communication terminal apparatus 100 an evaluation result of voice communication including the evaluation value of voice quality calculated by the communication terminal apparatus 100 and the determination result of call drop of voice communication determined by the communication terminal apparatus 100, and evaluation result memory means of memorizing an evaluation result of voice communication received from the communication terminal apparatus 100.

In one example of voice communication evaluation in an uplink direction of the present embodiment, the main controller of the communication terminal apparatus 100 may also function as sound source file memory means of memorizing the sound source file of the forgoing predetermined test signal.

Furthermore, the main controller, antenna, transmitting amplifier, receiving amplifier, radio signal processing section, baseband signal processing section, and so on of the communication terminal apparatus 100 may also function as being each of means such as outgoing call means of performing an outgoing call of voice communication to the automatic voice response apparatus 410 of the voice communication evaluation system 400 via the networks 200 and 300 based on a predetermined schedule set in advance, test signal transmitting means of transmitting a test signal to the automatic voice response apparatus 410 of the voice communication evaluation system 400 via the networks 200 and 300, and the like.

Moreover, the main controller, antenna, transmitting amplifier, receiving amplifier, radio signal processing section, baseband signal processing section, and so on of the communication terminal apparatus 100 may also function as download means of downloading contents such as music, etc. from the contents providing server 600.

Further, the computer apparatus and external communication interface apparatus of the automatic voice response apparatus 410 may also function as being each of means such as sound source file memory means of memorizing a sound source file of the forgoing predetermined test signal, test signal receiving means of receiving a test signal from the communication terminal apparatus 100 via the networks 200 and 300 when receiving the outgoing call from the communication terminal apparatus 100, recording means of recording the test signal received from the communication terminal apparatus 100 and storing as a recorded audio file, and the like.

Furthermore, the computer apparatus and external communication interface apparatus of the analysis server 420 may also function as being each of means such as recorded audio file receiving means of receiving from the automatic voice response apparatus 410 a recorded audio file of the test signal received by the automatic voice response apparatus 410, calculating means of calculating an evaluation value of voice quality by comparing the voice signal during a voiced period of the test signal in the sound source file with the voice signal during a voiced period in the recorded audio file, determining means of determining a presence or absence of a call drop of voice communication based on a presence or absence of a disconnection of communication in the test signal of the recorded audio file, evaluation result memory means of memorizing an evaluation result of voice communication including the evaluation value of voice quality and a determination result of call drop, and the like.

In another example of voice communication evaluation in an uplink direction of the present embodiment, the main controller of the communication terminal apparatus 100 may also function as being each of means such as sound source file memory means of memorizing a sound source file of the forgoing predetermined test signal, calculating means of calculating an evaluation value of voice quality by comparing the voice signal during a voiced period of the test signal of the sound source file with the voice signal during a voiced period of the recorded audio file received from the automatic voice response apparatus 410, determining means of determining a presence or absence of a call drop of voice communication based on a presence or absence of a disconnection of communication in the test signal of the recorded audio file, and the like.

Furthermore, the main controller, antenna, transmitting amplifier, receiving amplifier, radio signal processing section, baseband signal processing section, and so on of the communication terminal apparatus 100 may also function as being each of means such as test signal transmitting means of transmitting a test signal via the networks 200 and 300 by performing an outgoing call to the automatic voice response apparatus 410, recorded audio file receiving means of receiving from the automatic voice response apparatus 410 a recorded audio file of the test signal received by the automatic voice response apparatus 410, evaluation result transmitting means of transmitting the evaluation result of voice communication including the forgoing evaluation value of voice quality and a determination result of call drop to the voice communication evaluation system 400, and the like.

Moreover, the main controller, antenna, transmitting amplifier, receiving amplifier, radio signal processing section, baseband signal processing section, and so on of the communication terminal apparatus 100 may also function as means of downloading contents such as music, etc. from the contents providing server 600.

Further, the computer apparatus and external communication interface apparatus of the automatic voice response apparatus 410 may also function as being each of means such as test signal receiving means of receiving a test signal from the communication terminal apparatus 100 via the networks 200 and 300, recording means of recording the test signal received from the communication terminal apparatus 100 and storing as a recorded audio file, recorded audio file transmitting means of transmitting the recorded audio file to the communication terminal apparatus 100.

Furthermore, the computer apparatus and external communication interface apparatus of the analysis server 420 may also function as evaluation result receiving means of receiving from the communication terminal apparatus 100 an evaluation result of voice communication including the evaluation value of voice quality calculated by the communication terminal apparatus 100 and the determination result of call drop of voice communication determined by the communication terminal apparatus 100, evaluation result memory means of memorizing an evaluation result of voice communication received from the communication terminal apparatus 100.

An application of voice communication evaluation (hereinafter called as "voice communication evaluation app") implemented in the communication terminal apparatus 100 has a plurality of operation modes. For example, the voice communication evaluation app has a manual measurement mode for starting an evaluation process of voice communication by manually activating the app with a user and an automatic measurement mode for starting an evaluation process of voice communication based on schedule information delivered in advance, under a constantly activating state in which the voice communication evaluation app is running in the background. The manual measurement mode and automatic measurement mode can be selected based on, for example, a selecting operation by a user or an instruction from the voice communication evaluation system 400. Furthermore, the voice communication evaluation app has a terminal calculation/determination mode of calculating an evaluation value of voice quality and determining a call drop of the voice communication in the communication terminal apparatus 100, and a server calculation/determination mode of calculating an evaluation value of voice quality and determining a call drop of the voice communication in the analysis server 420 of the voice communication evaluation system 400. With respect to the terminal calculation/determination mode and the server calculation/determination mode, the mode can be also selected based on, for example, a selecting operation by a user or an instruction from the voice communication evaluation system 400.

Figure 2:
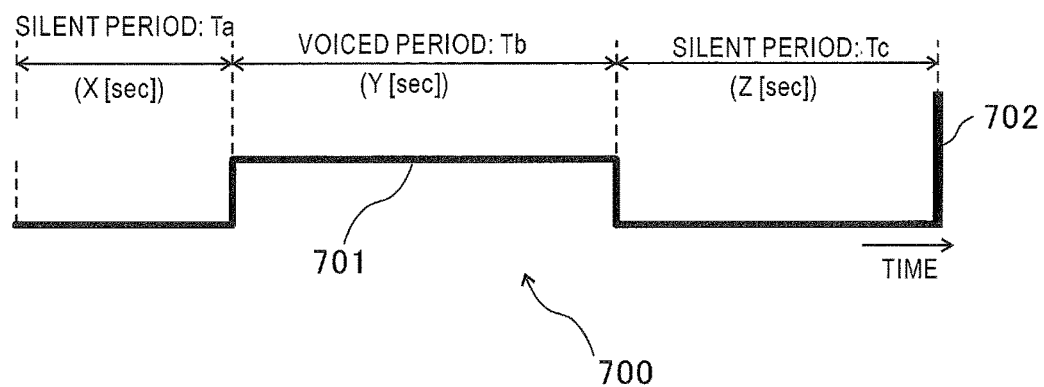
FIG. 2 is a schematic diagrams showing one example of a test signal for voice communication quality evaluation, respectively.

FIG. 2 is a schematic diagram showing one example of the foregoing test signal for voice communication quality evaluation. The test signal 700 in FIG. 2 has a first silent period Ta, a voiced period Tb with a test signal 701 used for evaluation of voice quality and a second silent period Tc used for evaluation of a call drop of the voice communication, and each of the periods is continuously disposed in that order. The tail end portion of second silent period Tc has an end-identification signal 702 with a specific sound for identifying the end of the silent period Tc. Each of the first silent period Ta, the voiced period Tb and the second silent period Tc is set so as to have a predetermined length (X [sec], Y [sec], Z [sec]).

The length (Y [sec]) of the voiced period Tb in the test signal is set to a length (for example, length of above 8 [sec] and below 10 [sec]) predetermined for calculating a MOS value. Furthermore, the lengths (X [sec] and Z [sec]) of the first silent period Ta and the second silent period Tc may be set by the automatic voice response apparatus 410 based on various information. For example, each of the lengths (X [sec] and Z [sec]) of the first silent period Ta and the second silent period Tc may be set to an optimum length based on at least one of a communication history of the communication terminal apparatus 100, a model of the communication terminal apparatus 100, a current location (GPS position, area, existing cell, etc.) of the communication terminal apparatus 100, a time period (weekday/holiday, day of week, early morning/daytime/nighttime), a moving speed (for example, resting, low speed during moving on foot or the like, high speed during moving by car, train or the like) of the communication terminal apparatus, communication-carrier information of the mobile communication network 200, and communication quality information in the communication terminal apparatus 100 (for example, receiving SINR (Signal-to-Interference and Noise power Ratio)). Furthermore, it may be configured so as to have an automatic learning function of successively learning and updating the optimum value of each length (X [sec], Z [sec]) of the silent period Ta and silent period Tc, and the last optimum value may be preferentially set as each length (X [sec], Z [sec]) of the foregoing silent period Ta and silent period Tc in a next test signal. Moreover, the total value of lengths (X [sec], Y [sec], Z [sec]) of the first silent period Ta, the voiced period Tb and the second silent period Tc may be set so as to be equal to or less than a predetermined length (for example, 100 [sec]).

Furthermore, the automatic voice response apparatus 410 may advancely memorize a plurality of types of sound source files including mutually different pattern of test signals that are different in length of at least one of the first silent period Ta, the voiced period Tb and the second silent period Tc between themselves, select a test signal to be transmitted from the plurality of types of test signals, and transmit the selected test signal to the communication terminal apparatus 100. This selection of test signal may be performed based on various kinds of information. For example, an optimum test signal may be selected based on at least one of a communication history of the communication terminal apparatus 100, a model of the communication terminal apparatus 100, a current location (GPS position, area, existing cell, etc.) of the communication terminal apparatus 100, a time period (weekday/holiday, day of week, early morning/daytime/nighttime), a moving speed (for example, low speed during moving on foot and or the like, high speed during moving by car, train or the like) of the communication terminal apparatus 100, communication-carrier information of the mobile communication network 200, and communication quality information in the communication terminal apparatus 100 (for example, receiving SINR). Furthermore, it may be configured so as to have an automatic learning function of successively learning and updating the test signals to be transmitted, which are selected in this way, and the last selected test signal may be preferentially selected as a next test signal. For example, in a case that moving speed of the communication terminal apparatus 100 is low speed which is lower than a predetermined threshold value such as a case of staying at home, moving on foot, or the like, a test signal with the second silent period Tc set to shorter time may be selected, and in another case that moving speed of the communication terminal apparatus 100 is high speed which is equal to or higher than a predetermined threshold value such as a case of moving by car a test signal with the second silent period Tc set to longer time may be selected.

Figure 3:
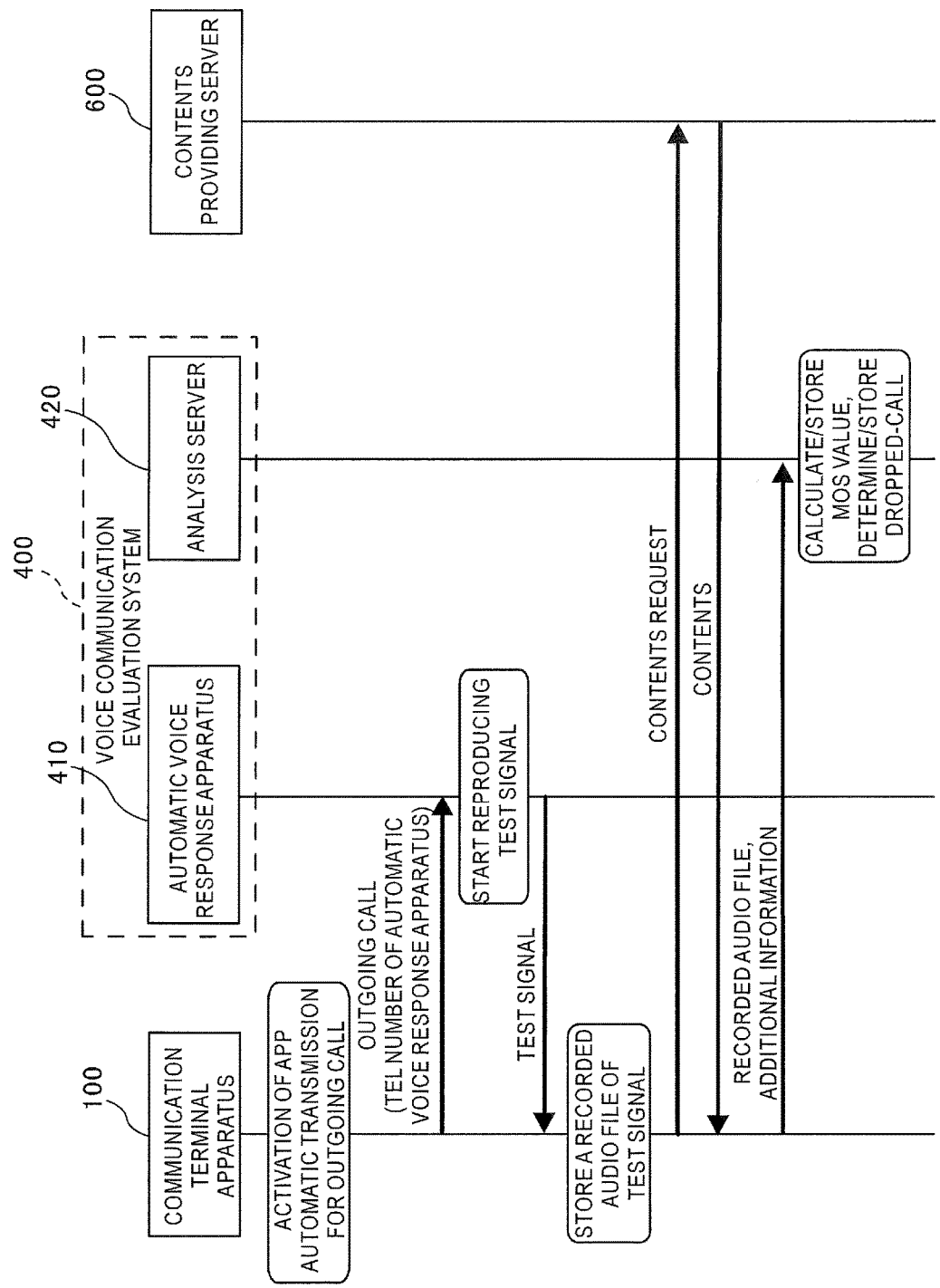
FIG. 3 is a sequence diagram showing one example of voice communication evaluation in a downlink direction when performing an outgoing call from a communication terminal apparatus in the communication system according to the present embodiment.

FIG. 3 is a sequence diagram showing one example of voice communication evaluation in a downlink direction when performing an outgoing call from a communication terminal apparatus in the communication system according to the present embodiment. It is noted that, this present example shows an example in which the voice communication evaluation system 400 calculates a MOS value indicating a voice quality and determines a call drop of the voice communication. In the analysis server 420, a sound source file of test signal for voice communication quality evaluation is stored. In the communication terminal apparatus 100, a voice communication evaluation app for performing an evaluation process of voice communication is installed in advance.

In FIG. 3, when a predetermined voice communication evaluation timing has come, the communication terminal apparatus 100 automatically activates the voice communication evaluation app and performs an automatic transmission for an outgoing call to a telephone number (for example, a fixed-telephone number, 03********) of the automatic voice response apparatus 410. The telephone number of the automatic voice response apparatus 410 is set in the voice communication evaluation app in advance.

When receiving the outgoing call from the communication terminal apparatus 100, the automatic voice response apparatus 410 starts reproducing a test signal for voice communication quality evaluation based on the sound source file for voice communication quality evaluation. The reproduced test signal is transmitted to the communication terminal apparatus 100 via the fixed-telephone network 300 and the mobile communication network 200.

The communication terminal apparatus 100 records a test signal received from the automatic voice response apparatus 410, and stores as a recorded audio file. When the reception, recording and store of the test signal are completed, the communication terminal apparatus 100, based on information on connection destination (for example, IP address or URL, ID, password, identification information or file name of contents) set in advance, accesses the contents providing server 600 by connecting the Internet 500, logons the server, and transmits a contents request for requesting a contents such as music, etc. which is a privilege given when performing a voice communication evaluation. The contents providing server 600 responds to the contents request from the communication terminal apparatus 100 and transmits a file of the contents such as music, etc. designated by the contents request to the communication terminal apparatus 100. The communication terminal apparatus 100 stores the file of contents such as music, etc. downloaded from the contents providing server 600 in a designated folder. Herein, when the download of the contents file is failed, the communication terminal apparatus 100 performs the download of contents again by the voice communication evaluation app.

When the download of the contents file is succeeded (completed), the communication terminal apparatus 100 transmits the forgoing recorded audio file of the test signal, information on a presence or absence of communication disconnection during receiving the test signal and below-mentioned other additional information to the analysis server 420. It is noted that, the additional information is, for example, on at least one of a terminal identification information (for example, mobile number) of the communication terminal apparatus 100, a current location (GPS position, area, existing cell, etc.) of the communication terminal apparatus 100, date and time information, a moving speed (for example, low speed during moving on foot and or the like, high speed during moving by car, train or the like) of the communication terminal apparatus 100, communication-carrier information of the mobile communication network 200, and communication quality information in the communication terminal apparatus 100 (for example, receiving SINR). The foregoing moving speed of the communication terminal apparatus 100 may be used for identifying, for example, a cause of quality deterioration of voice communication.

When receiving the foregoing recorded audio file of the test signal, information on a presence or absence of communication disconnection during receiving the test signal and other additional information, the analysis server 420 compares the voice signal within the voiced period Tb in the sound source file with the voice signal within the voiced period Tb in the recorded audio file, and calculates and stores a MOS value being as an evaluation value of voice quality based on the comparison result. Furthermore, the analysis server 420 determines a presence or absence of call drop of the voice communication based on the presence or absence of communication disconnection in during the second silent period Tc of the test signal. For example, it is determined that there is no communication disconnection of voice communication in the case that the test signal of the recorded audio file includes the end-identification signal 702, and it is determined that there is a communication disconnection of voice communication in the case that the test signal of the recorded audio file does not include the end-identification signal 702 (refer to FIG. 2).

The analysis server 420 stores the recorded audio file received from the communication terminal apparatus 100 and the information on the presence or absence of communication disconnection during receiving the test signal, the evaluation result of voice communication including the evaluation value (MOS value) of voice quality and the determination result of call drop, and the foregoing additional information, by being associated with each other.

As described above, according to the example in FIG. 3, by performing the automatic transmission from the communication terminal apparatus 100 to the automatic voice response apparatus 410 at the predetermined voice communication evaluation timing set in advance, it is capable of evaluating the voice quality and the presence or absence of a call drop in downlink direction (downlink) voice communication of the mobile communication network 200. Furthermore, it is not necessary to request any special operation for the voice communication evaluation to a user of the communication terminal apparatus 100 in performing the voice communication evaluation.

Figure 4:
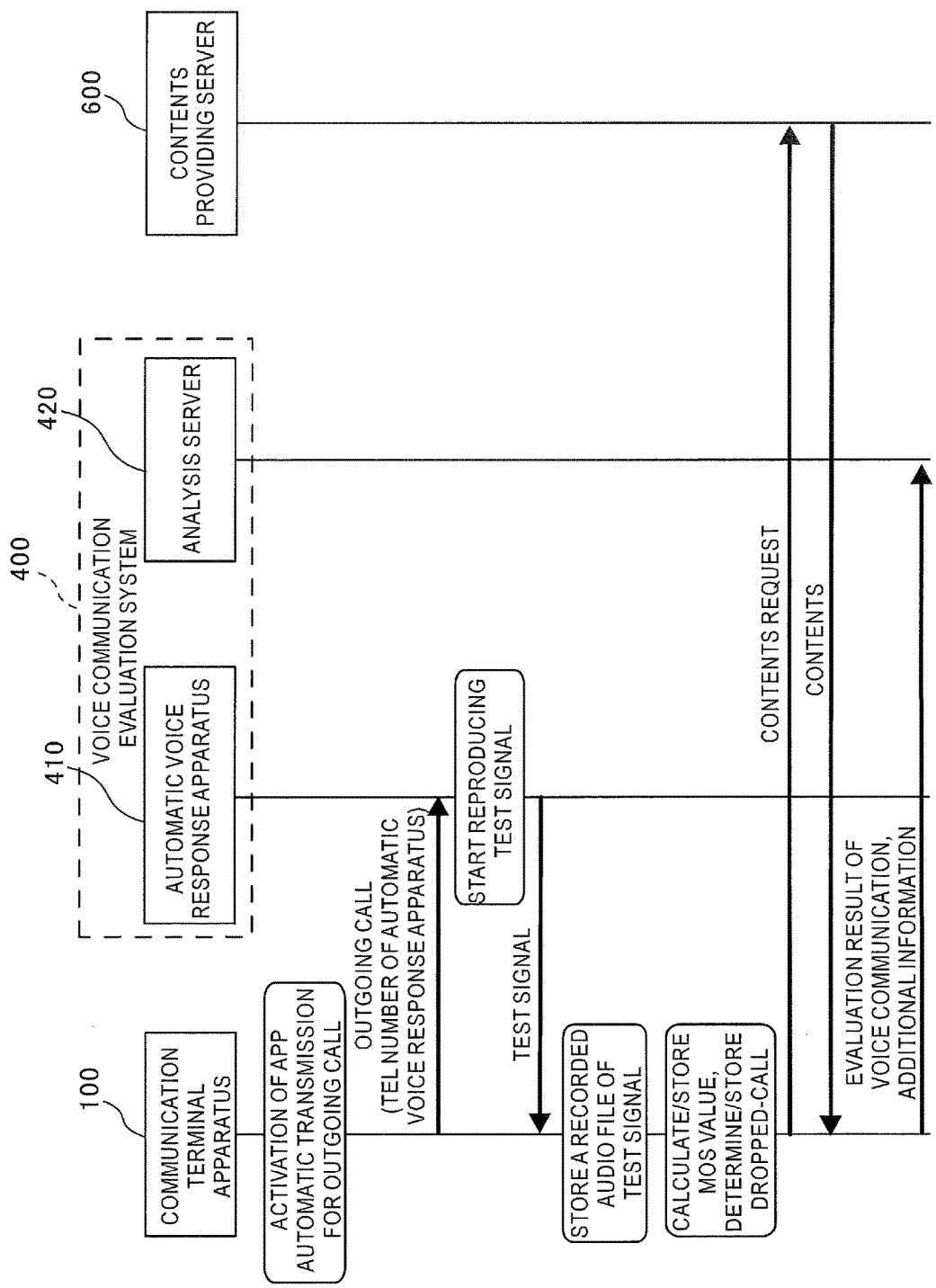
FIG. 4 is a sequence diagram showing another example of voice communication evaluation in a downlink direction when performing an outgoing call from a communication terminal apparatus in the communication system according to the present embodiment.

FIG. 4 is a sequence diagram showing another example of voice communication evaluation in a downlink direction when performing an outgoing call from a communication terminal apparatus in the communication system according to the present embodiment. It is noted that, this present example shows an example in which the communication terminal apparatus 100 calculates a MOS value indicating a voice quality and determines a call drop of the voice communication. In the communication terminal apparatus 100, a sound source file same as the sound source file of a test signal for voice communication quality evaluation stored by the automatic voice response apparatus 410 is also stored. In the communication terminal apparatus 100, a voice communication evaluation app for performing an evaluation process of voice communication is installed in advance.

It is noted that, in FIG. 4, a description from the automatically activation of the voice communication evaluation app to the store of the recorded audio file of the test signal, which is the same or substantially the same part as that of the aforementioned example in FIG. 3, will be omitted.

In FIG. 4, when the reception, recording and store of the test signal are completed, the communication terminal apparatus 100 compares the voice signal within the voiced period Tb in the sound source file with the voice signal within the voiced period Tb in the recorded audio file, and calculates and stores a MOS value being as an evaluation value of voice quality based on the comparison result. Furthermore, the communication terminal apparatus 100 determines a presence or absence of call drop of the voice communication based on the presence or absence of communication disconnection in during the second silent period Tc of the test signal. For example, it is determined that there is no communication disconnection of voice communication in the case that the test signal of the recorded audio file includes the end-identification signal 702, and it is determined that there is a communication disconnection of voice communication in the case that the test signal of the recorded audio file does not include the end-identification signal 702 (refer to FIG. 2).

When completing the store of the evaluation result of voice communication including the evaluation value (MOS value) of voice quality and the determination result of call drop, the communication terminal apparatus 100, based on information on connection destination (for example, IP address or URL, ID, password, identification information or file name of contents) set in advance, accesses the contents providing server 600 by connecting the Internet 500, logons the server, and transmits a contents request for requesting a contents such as music, etc. which is a privilege given when performing a voice communication evaluation. The contents providing server 600 responds to the contents request from the communication terminal apparatus 100 and transmits a file of the contents such as music, etc. designated by the contents request to the communication terminal apparatus 100. The communication terminal apparatus 100 stores the file of contents such as music, etc. downloaded from the contents providing server 600 in a designated folder. Herein, when the download of the contents file is failed, the communication terminal apparatus 100 retries the download of contents by the voice communication evaluation app.

When the download of the contents file is succeeded (completed), the communication terminal apparatus 100 transmits the forgoing evaluation result of voice communication including the evaluation value (MOS value) of voice quality and the determination result of call drop, and other additional information to the analysis server 420. It is noted that, the forgoing evaluation result of voice communication may include the recorded audio file of the test signal.

Table 2 is a list showing one example of information capable of being transmitted (uploaded) from the foregoing communication terminal apparatus 100 to the analysis server 420.

TABLE 2

| | Voice communication evaluation result | Evaluation value of voice quality (MOS value), Determination result of call drop, Recorded audio file |
|---|---|---|
| Additional information | Measurement-related information | Measurement time (date and time information), Measurement location |
| | Terminal information | Terminal identification number (IMSI), Mobile number, Model name, Carrier information, Moving speed |

TABLE 2-continued

| | |
|---|---|
| Voice communication evaluation result | Evaluation value of voice quality (MOS value), Determination result of call drop, Recorded audio file |
| Network information | Connected network type, Base-station information, Radio quality information, Roaming information |

As shown in the example of Table 2, measurement-related information, terminal information, network information and the like are exemplified as additional information transmitted to the analysis server 420 together with the foregoing result of voice communication quality evaluation.

The measurement-related information is location information (GPS position, area, existing cell, etc.) of a communication terminal apparatus 100 that performs measurements of an evaluation value (MOS value) of voice communication quality and call drops, date and time information of the measurement, or the like.

The terminal information is a terminal identification number (for example, IMSI: International Mobile Subscriber Identity), mobile number, model name, information on a subscribed communication carrier (carrier information), moving speed (resting, low speed during moving on foot or the like, high speed during moving by car, train or the like) of the communication terminal apparatus 100 that performs a voice communication via the mobile communication network 200 to be measured, or the like. The foregoing moving speed of the communication terminal apparatus 100 may be used for identifying, for example, a cause of quality deterioration of voice communication.

The network information is a connected network type used for performing the voice communication, base-station information, radio quality information, roaming information, or the like. Herein, for example, in the case of voice communication in compliance with the communication standards of LTE (Long Term Evolution), a physical cell ID, a cell ID, area information, etc. are exemplified as the base-station information, and an RSSI (Received Signal Strength Indicator), an RSRP (Reference Signal Received Power), a SNR (Signal-Noise Ratio), a CQI (Channel Quality Indicator), etc. are exemplified as the radio quality information. In the case of voice communication in compliance with the communication standards (IMT-2000: International Mobile Telecommunication 2000) of 3G (3rd Generation), a physical cell ID, a cell ID, area information, RNC (Radio Network Controller) information, etc. are exemplified as the base-station information, and an RSSI (Received Signal Strength Indicator), an RSCP (Received Signal Code Power), a BER (Bit Error Rate), etc. are exemplified as the radio channel quality information.

When receiving the foregoing result of voice communication evaluation and the additional information, etc., the analysis server 420 stores the result of voice communication evaluation and the other foregoing additional information, by being associated with each other.

As described above, according to the example in FIG. 4, by performing the automatic transmission from the communication terminal apparatus 100 to the automatic voice response apparatus 410 at the predetermined voice communication evaluation timing set in advance, it is capable of evaluating the voice quality and the presence or absence of a call drop in downlink direction (downlink) voice communication of the mobile communication network 200. Furthermore, it is not necessary to request any special operation for the voice communication evaluation to a user of the communication terminal apparatus 100 in performing the voice communication evaluation.

Figure 5:
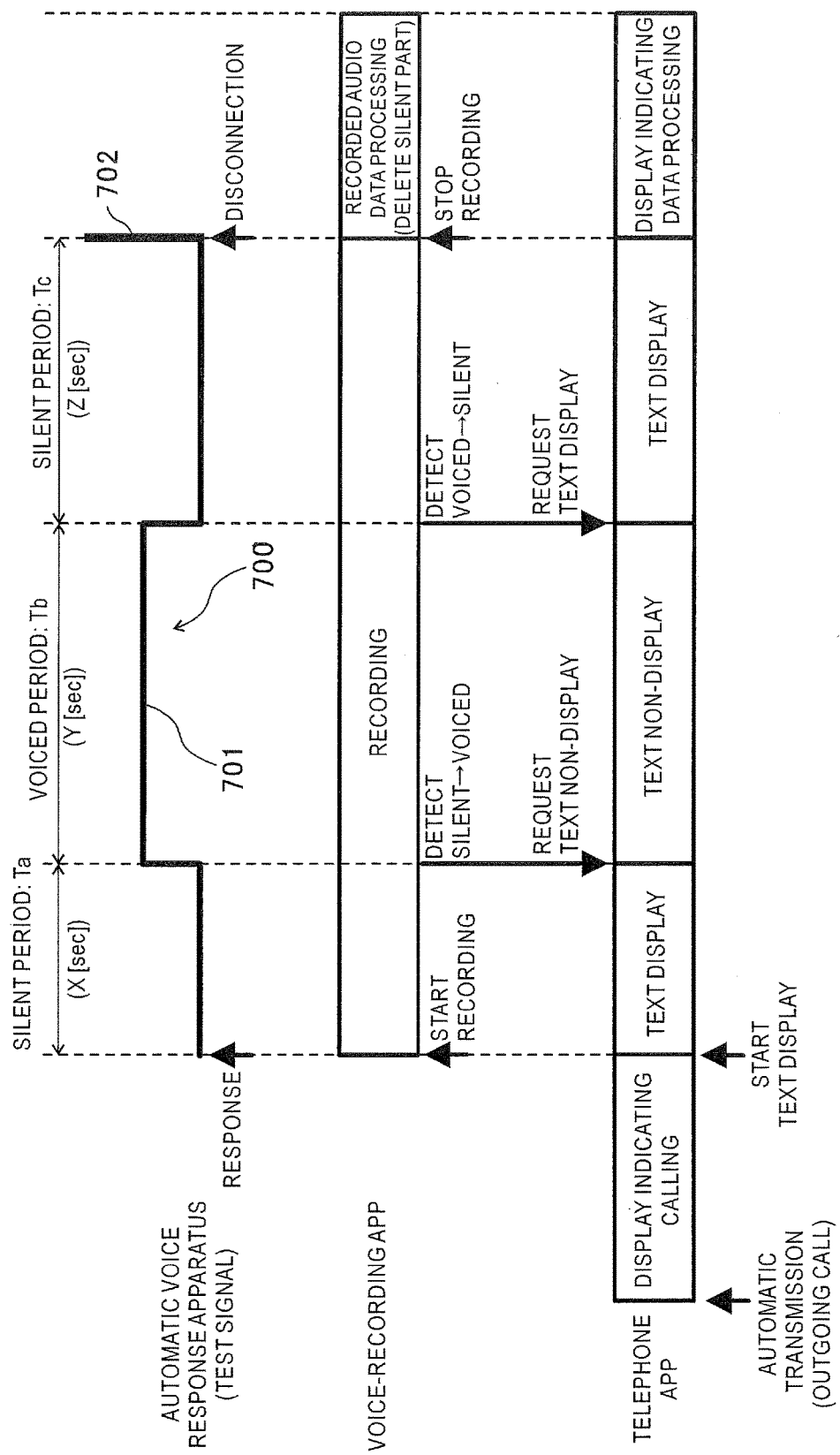
FIG. 5 is a schematic diagram showing one example of voice recording, detection of a call drop of voice communication and control of display when receiving the test signal in the communication terminal apparatus.

FIG. 5 is a schematic diagram showing one example of voice recording, detection of the call drop of the voice communication and display when receiving the test signal in the communication terminal apparatus 100. In the example in FIG. 5, the voice communication evaluation app, which is not shown, performs processes by cooperating with a voice-recording app and a telephone app storing pre-installed in the communication terminal apparatus 100.

In FIG. 5, when the telephone app of the communication terminal apparatus 100 automatically perform a outgoing call to the automatic voice response apparatus 410, a display of calling is displayed on the display section of the communication terminal apparatus 100. When the automatic voice response apparatus 410 responds to and starts transmitting the test signal, in trigger to the response, the voice-recording app starts to record. The voice-recording app, for example using an Audio Record class, extracts a volume of sound in real time from the buffer during recording. Furthermore, the telephone app, in trigger to the forgoing response, displays text indicating that the voice communication evaluation is executing.

Then, the voice-recording app determines a voiced state of the voiced period Tb, when the volume level equal to or higher than a threshold value continues for a predetermined time in a silent state of the first silent period Ta. When detecting a change from the silent state to the voiced state, the voice-recording app transmits a request for non-text displaying to the telephone app. By this way, the text display is stopped in the display section of the communication terminal apparatus 100.

Furthermore, the voice-recording app determines a silent state of the second silent period Tc, when the volume level equal to or lower than a threshold value continues for a predetermined time in a silent state of the voiced period Tb. When detecting a change from the voiced state to the silent state, the voice-recording app transmits a request for text displaying to the telephone app. By this way, a text display indicating that the voice communication evaluation is executing is performed on the display section of the communication terminal apparatus 100.

Herein, a manual call disconnection (end call) by a user of the communication terminal apparatus 100 is always detected by the telephone app. Then, when the voice communication is disconnected (terminated) by manual operation within the sections of the forgoing first silent period Ta and the voiced period Tb, the disconnection is determined as error. Furthermore, when the voice communication is terminated by manual operation within the section of the forging second silent period Tc, the termination is determined as normal. When the voice communication is disconnected within the section of the forging second silent period Tc due to other than the manual termination, that is, when the end-identification signal 702 does not record or detect, it is determined that a call drop of the voice communication occurs. The lengths (Z [sec]) of the second silent period Tc may be determined by an elapsed time from detection of change from the voiced state to the silent state, but also may be determined by the end-identification signal 702 in this example.

In the aforementioned embodiments, the voice communication evaluation system 400 may transmit schedule information of the foregoing voice communication evaluation timing as a voice communication evaluation condition to the communication terminal apparatus 100. In this case, the communication terminal apparatus 100 receives the schedule information as a voice communication evaluation condition from the voice communication evaluation system 400 and performs an outgoing call to the voice communication evaluation system 400 at a predetermined voice communication evaluation timing designated by the received schedule information. It is noted that, the forgoing schedule information may be delivered to the communication terminal apparatus 100 and the automatic voice response apparatus 410 from the delivery server that is not shown.

The foregoing schedule information may be changed based on at least one of terminal identification information (for example, mobile number) of the communication terminal apparatus 100, a communication history of the communication terminal apparatus 100, a model of the communication terminal apparatus 100, a current location (GPS position, area, existing cell, etc.) of the communication terminal apparatus 100, time period (a weekday/holyday, day of week, early morning/daytime/nighttime), a moving speed (for example, resting, low speed during moving on foot, high speed during moving by car, train or the like) of the communication terminal apparatus 100, communication-carrier information of the mobile communication network 200, and communication quality information in the communication terminal apparatus 100 (for example, receiving SINK).

For example, when it is determined that the communication terminal apparatus 100 locates in an event site of a festival, a display of fireworks, etc. where many communication terminal apparatuses exist around there with high probability, based on the information of current location of the communication terminal apparatus 100, the foregoing schedule information may be changed so as to cancel the voice communication evaluation process or restrict the number of the voice communication evaluation processes in the time period during the course of the event. In the case that the moving speed of communication terminal apparatus 100 is high speed that is higher than a predetermined threshold such as the case of moving by a train or the like, the foregoing schedule information may be changed so as to cancel the voice communication evaluation process.

Furthermore, the present system may be configured so as to have an automatic learning function of sequentially learning and updating the foregoing schedule information for each of the communication terminal apparatus 100, and the voice communication evaluation timing at which the evaluation recently performed may be preferentially set as a next voice communication evaluation timing for each of the communication terminal apparatus 100.

Moreover, by setting and changing the foregoing schedule information, for example, voice communication evaluation (MOS value, presence or absence of a call drop) for the mobile communication network 200 at a particular time period and a particular place can be performed, and voice communication evaluation (MOS value, presence or absence of a call drop) for a specific model of the communication terminal apparatus can be performed.

Further, with respect to the foregoing schedule information, a voice communication evaluation timing may be randomly set.

Figure 6:
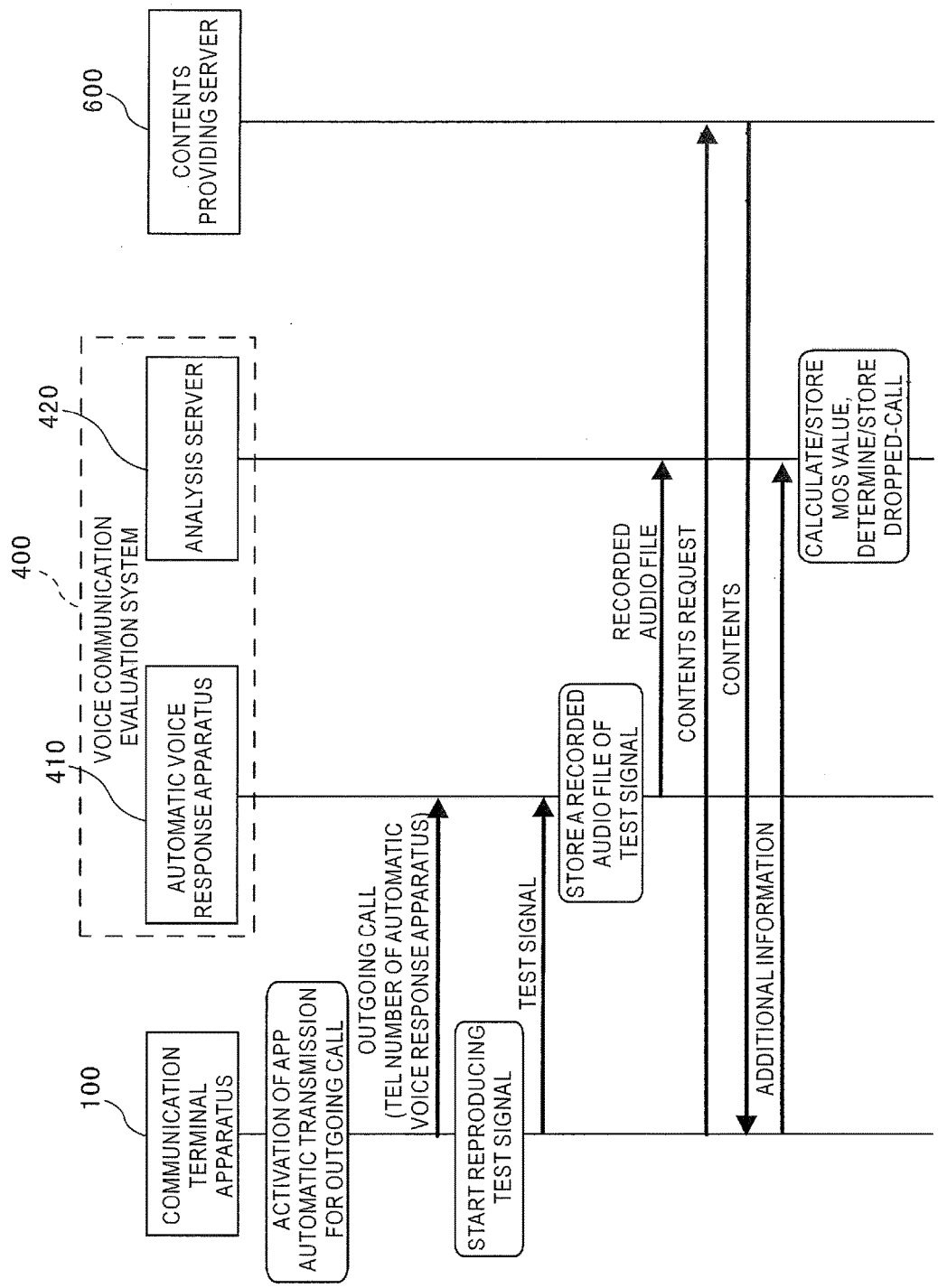
FIG. 6 is a sequence diagram showing one example of voice communication evaluation in an uplink direction when performing an outgoing call from a communication terminal apparatus in the communication system according to the present embodiment.

FIG. 6 is a sequence diagram showing one example of voice communication evaluation in an uplink direction when performing an outgoing call from a communication terminal apparatus in the communication system according to the present embodiment. It is noted that, this present example shows an example in which the voice communication evaluation system 400 calculates a MOS value indicating a voice quality and determines a call drop of the voice communication. In the analysis server 420, a sound source file of a test signal for voice communication quality evaluation is stored. In the communication terminal apparatus 100, a voice communication evaluation app for performing an evaluation process of voice communication is installed in advance. It is noted that, a description of the same or substantially the same part as that of the aforementioned example in FIG. 3 and FIG. 4 will be omitted.

In FIG. 6, when a predetermined voice communication evaluation timing has come, the communication terminal apparatus 100 automatically activates the voice communication evaluation app and performs an automatic transmission for an outgoing call to a telephone number (for example, a fixed-telephone number, 03******) of the automatic voice response apparatus 410. The telephone number of the automatic voice response apparatus 410** is set in the voice communication evaluation app in advance.

When the automatic voice response apparatus 410 receives the outgoing call from the communication terminal apparatus 100, the communication terminal apparatus 100 starts reproducing a test signal for voice communication quality evaluation based on the sound source file for voice communication quality evaluation. The reproduced test signal is transmitted to the automatic voice response apparatus 410 via the fixed-telephone network 300 and the mobile communication network 200.

The automatic voice response apparatus 410 records the test signal received from the communication terminal apparatus 100, and stores as a recorded audio file. When the reception, recording and store of the test signal are completed, the automatic voice response apparatus 410 transmits the forgoing recorded audio file of the test signal and the information on the presence or absence of communication disconnection during receiving the test signal to the analysis server 420.

On the other hand, the communication terminal apparatus 100, after transmitting the test signal, accesses the contents providing server 600 by connecting the Internet 500 based on information on connection destination set in advance, logons the server, and transmits a contents request for requesting contents such as music, etc. which is a privilege given when performing a voice communication evaluation. The contents providing server 600 responds to the contents request from the communication terminal apparatus 100 and transmits a file of the contents such as music, etc. designated by the contents request to the communication terminal apparatus 100. The communication terminal apparatus 100 stores the file of contents such as music, etc. downloaded from the contents providing server 600 in a designated folder.

When the download of the contents file is succeeded (completed), the communication terminal apparatus 100 transmits the forgoing additional information to the analysis server 420.

When receiving the foregoing recorded audio file of the test signal, the information on the presence or absence of communication disconnection during receiving the test signal and other additional information, the analysis server 420 compares the voice signal within the voiced period Tb in the sound source file with the voice signal within the voiced period Tb in the recorded audio file, and calculates and stores a MOS value being as an evaluation value of voice quality based on the comparison result. Furthermore, the analysis server 420 determines a presence or absence of call drop of the voice communication based on the presence or absence of communication disconnection in the second silent period Tc of the test signal.

The analysis server 420 stores the recorded audio file received from the automatic voice response apparatus 410 and the information on the presence or absence of communication disconnection during receiving the test signal, the evaluation result of voice communication including the evaluation value (MOS value) of voice quality and the determination result of call drop, and the foregoing additional information, by being associated with each other.

As described above, according to the example in FIG. 6, by performing the automatic transmission from the communication terminal apparatus 100 to the automatic voice response apparatus 410 at the predetermined voice communication evaluation timing set in advance, it is capable of evaluating the voice quality and the presence or absence of a call drop in an uplink-direction (uplink) voice communication of the mobile communication network 200. Furthermore, it is not necessary to request any special operation for the voice communication evaluation to a user of the communication terminal apparatus 100 in performing the voice communication evaluation.

Figure 7:
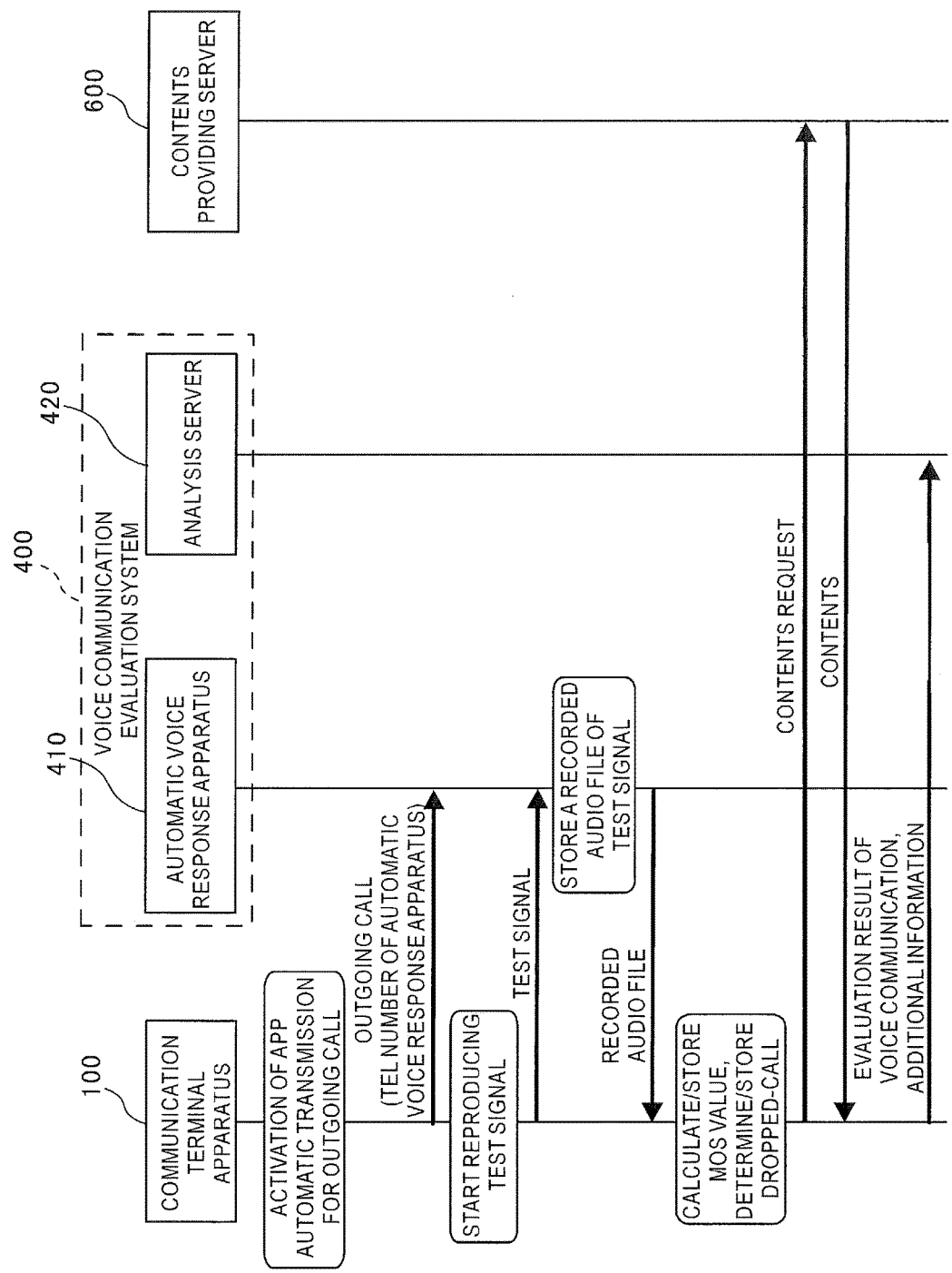
FIG. 7 is a sequence diagram showing another example of voice communication evaluation in an uplink direction when performing an outgoing call from a communication terminal apparatus in the communication system according to the present embodiment.

FIG. 7 is a sequence diagram showing another example of voice communication evaluation in an uplink direction when performing an outgoing call from a communication terminal apparatus in the communication system according to the present embodiment. It is noted that, this present example shows an example in which the communication terminal apparatus 100 calculates a MOS value indicating a voice quality and determines a call drop of the voice communication. In the communication terminal apparatus 100, a sound source file for voice communication quality evaluation is also stored. Further, in the communication terminal apparatus 100, a voice communication evaluation app for performing an evaluation process of voice communication is installed in advance.

It is noted that, in FIG. 7, a description from the automatically activation of the voice communication evaluation app to the store of the recorded audio file of the test signal, which is the same or substantially the same part as that of the aforementioned example in FIG. 6, will be omitted. Furthermore, a description of the same or substantially the same part as that of the aforementioned example in FIG. 3 and FIG. 4 will be omitted.

In FIG. 7, when the reception, recording and store of the test signal are completed, the automatic voice response apparatus 410 transmits the recorded audio file to the communication terminal apparatus 100.

When receiving the recorded audio file from the automatic voice response apparatus 410, the communication terminal apparatus 100 compares the voice signal within the voiced period Tb in the sound source file with the voice signal within the voiced period Tb in the recorded audio file, and calculates and stores a MOS value being as an evaluation value of voice quality based on the comparison result. Furthermore, the communication terminal apparatus 100 determines a presence or absence of call drop of the voice communication based on the presence or absence of communication disconnection in the second silent period Tc of the test signal.

When completing the store of the voice communication evaluation result including the evaluation value (MOS value) of voice quality and the determination result of call drop, the communication terminal apparatus 100, based on information on connection destination set in advance, accesses the contents providing server 600 by connecting the Internet 500, logons the server, and transmits a contents request for requesting a contents such as music, etc. which is a privilege given when performing a voice communication evaluation. The contents providing server 600 responds to the contents request from the communication terminal apparatus 100 and transmits a file of the contents such as music, etc. designated by the contents request to the communication terminal apparatus 100. The communication terminal apparatus 100 stores the file of contents such as music, etc. downloaded from the contents providing server 600 in a designated folder.

When the download of the contents file is succeeded (completed), the communication terminal apparatus 100 transmits the forgoing evaluation result of voice communication including the evaluation value (MOS value) of voice quality and the determination result of call drop, and other additional information to the analysis server 420.

When receiving the foregoing result of voice communication evaluation and the additional information from the communication terminal apparatus 100, etc., the analysis server 420 stores the result of voice communication evaluation and the foregoing additional information by being associated with each other.

As described above, according to the example in FIG. 7, by performing the automatic transmission from the communication terminal apparatus 100 to the automatic voice response apparatus 410 at the predetermined voice communication evaluation timing set in advance, it is capable of evaluating the voice quality and the presence or absence of a call drop in an uplink-direction (uplink) voice communication of the mobile communication network 200. Furthermore, it is not necessary to request any special operation for the voice communication evaluation to a user of the communication terminal apparatus 100 in performing the voice communication evaluation.

It is noted that process steps and configuration elements in each of the communication terminal apparatus 100, the automatic voice response apparatus 410, the analysis server 420, the contents providing server 600, etc. described in the present specification can be implemented with various means as well as the aforementioned means. For example, these process steps and configuration elements may be implemented with hardware, firmware, software, or a combination thereof.

With respect to hardware implementation, means such as processing units or the like used for establishing the foregoing steps and configuration elements in entities (for example, various radio communication apparatuses, Node B, communication terminal apparatus, server, gateway, switching equipment, computer, hard disk drive apparatus, or optical disk drive apparatus) may be implemented in one or more of an application-specific IC (ASIC), a digital signal processor (DSP), a digital signal processing device (DSPD), a programmable logic device (PLD), a field programmable gate array (FPGA), a processor, a controller, a microcontroller, a microprocessor, a electronic device, other electronic unit, computer, or a combination thereof, which are designed so as to perform a function described in the present specification.

With respect to the firmware and/or software implementation, means such as processing units or the like for establishing the foregoing configuration elements may be implemented with a program (for example, a code such as a procedure, a function, a module, an instruction, etc.) for performing a function described in the present specification. In general, any computer/processor readable medium of materializing the code of firmware and/or software may be used for implementation of means such as processing units and so on for establishing the foregoing steps and configuration elements described in the present specification. For example, in a control apparatus, the firmware and/or software code may be stored in a memory and executed by a computer or processor. The memory may be implemented within the computer or processor, or outside the processor. Further, the firmware and/or software code may be stored in, for example, a medium capable being read by a computer or processor, such as a random-access memory (RAM), a read-only memory (ROM), a non-volatility random-access memory (NVRAM), a programmable read-only memory (PROM), an electrically erasable PROM (EEPROM), a FLASH memory, a floppy (registered trademark) disk, a compact disk (CD), a digital versatile disk (DVD), a magnetic or optical data storage unit, or the like. The code may be executed by one or more of computers and processors, and a certain aspect of functionalities described in the present specification may be executed by a computer or processor.

The description of embodiments disclosed in the present specification is provided so that the present disclosures can be produced or used by those skilled in the art. Various modifications of the present disclosures will be readily apparent to those skilled in the art and general principles defined in the present specification can be applied to other variations without departing from the spirit and scope of the present disclosures. Therefore, the present disclosures should not be limited to examples and designs described in the present specification and should be recognized to be in the broadest scope corresponding to principles and novel features disclosed in the present specification.

REFERENCE SIGNS LIST 100 communication terminal apparatus
200 mobile communication network
210 base station
300 fixed-telephone network
400 voice communication evaluation system
410 automatic voice response apparatus
420 analysis server
500 Internet
510 access-point apparatus of wireless LAN
600 contents providing server
700 test signal
701 voice signal
702 end-identification signal

The invention claimed is:

1. A communication system comprising a communication terminal apparatus and a voice communication evaluation system capable of communicating with the communication terminal apparatus via a communication network, comprising:
    means of performing a voice communication for transceiving a test signal for voice communication evaluation between the communication terminal apparatus and the voice communication evaluation system via the communication network, the test signal having a first silent period, a voiced period and a second silent period and each of the periods being continuously disposed in that order;
    means of calculating a voice quality evaluation value based on data during the voiced period of the test signal before transmission and data during the voiced period of the test signal after reception in the voice communication; and
    means of determining a presence or absence of a call drop of voice communication based on a presence or absence of a communication disconnection in the second silent period of the test signal.

2. The communication system according to claim 1,
    wherein the voice communication evaluation system transmits the test signal to the communication terminal apparatus via the communication network, and
    wherein the communication terminal apparatus receives and records the test signal from the voice communication evaluation system via the communication network, and
    wherein the voice communication evaluation system or the communication terminal apparatus calculates the voice quality evaluation value by making a comparison between the test signal before transmission and the recorded test signal, and determines the presence or absence of the call drop of voice communication based on the presence or absence of reception interruption of the test signal.

3. The communication system according to claim 1,
    wherein the communication terminal apparatus transmits the test signal to the voice communication evaluation system via the communication network, and
    wherein the voice communication evaluation system receives and records the test signal from the communication terminal apparatus via the communication network, and
    wherein the voice communication evaluation system or the communication terminal apparatus calculates the voice quality evaluation value by making a comparison between the signal before transmission and the recorded test signal, and determines the presence or absence of the call drop of voice communication based on the presence or absence of reception interruption of the test signal.

4. The communication system according to claim 1, wherein the communication terminal apparatus further comprises means of downloading contents from a contents providing server subject to no communication interruption for the test signal in the communication terminal apparatus.

5. The communication system according to claim 1,
    wherein the test signal has an end discriminating signal at a tail end thereof, and
    wherein the presence or absence of the call drop of voice communication is determined based on a presence or absence of the end discriminating signal in the test signal.

6. The communication system according to claim 1, wherein the voice communication of the test signal is performed based on a predetermined voice communication evaluation condition.

7. The communication system according to claim 6, further comprising means of delivering the voice communication evaluation condition to the communication terminal apparatus and the voice communication evaluation system, and
    wherein the communication terminal apparatus and the voice communication evaluation system perform the voice communication of the test signal when the voice communication evaluation condition is satisfied.

8. The communication system according to claim 7, further comprising means of changing the voice communication evaluation condition.

9. The communication system according to claim 1, the communication system memorizing the evaluation result of voice communication including the voice quality evaluation value and the determination result of call drop, and an additional information relating to at least one of the communication terminal apparatus, the communication network and the voice communication evaluation by being associated with each other.

10. The communication system according to claim 1, wherein the test signal transceived between the communication terminal apparatus and the voice communication evaluation system is selected from two or more types of test signals set in advance, the two or more types of test signals being different in length of at least one of the first silent period, the voiced period and the second silent period between themselves.

11. The communication system according to claim 10, wherein the test signal transceived between the communication terminal apparatus and the voice communication evaluation system is selected from the two or more types of test signals, based on at least one of a terminal identification information of the communication terminal apparatus, a communication history of the communication terminal apparatus, a model of the communication terminal apparatus, a current location of the communication terminal apparatus, a time period, a moving speed of the communication terminal apparatus, communication-carrier information of the communication network, and communication information in the communication terminal apparatus.

12. The communication system according to claim 1, further comprising:
means of learning successively and updating an optimum value of each length of the first silent period and the second silent period; and
means of setting preferentially the optimum value as each length of the first silent period and the second silent period in the test signal used for a next evaluation of the voice communication.

13. The communication system according to claim 1, wherein the length of the voiced period is set to a length predetermined for calculating a MOS value.

14. The communication system according to claim 1, wherein each of the lengths of the first silent period and the second silent period is set based on at least one of terminal identification information of the communication terminal apparatus, a communication history of the communication terminal apparatus, a model of the communication terminal apparatus, a current location of the communication terminal apparatus, a time period, a moving speed of the communication terminal apparatus, communication-carrier information of the mobile communication network, and communication information in the communication terminal apparatus.

15. The communication system according to claim 10, further comprising:
learning successively and updating the selected test signal to be transmitted; and
selecting preferentially the updated test signal as the test signal used for a next evaluation of the voice communication.

16. A communication method capable of evaluating a quality of voice communication, comprising:
performing a voice communication of transceiving a test signal for voice communication evaluation between a communication terminal apparatus and a voice communication evaluation system via a communication network, the test signal having a first silent period, a voiced period and a second silent period and each of the periods being continuously disposed in that order;
calculating a voice quality evaluation value based on data during the voiced period of the test signal before transmission and data during the voiced period of the test signal after reception in the voice communication; and
determining a presence or absence of a call drop of voice communication based on a presence or absence of a communication disconnection in the second silent period of the test signal.

17. The communication method according to claim 16, further comprising:
learning successively and updating the selected test signal to be transmitted; and
selecting preferentially the updated test signal as the test signal used for a next evaluation of the voice communication.

18. The communication method according to claim 16, wherein the length of the voiced period is set to a length predetermined for calculating a MOS value.

19. The communication method according to claim 16, wherein each of the lengths of the first silent period and the second silent period is set based on at least one of terminal identification information of the communication terminal apparatus, a communication history of the communication terminal apparatus, a model of the communication terminal apparatus, a current location of the communication terminal apparatus, a time period, a moving speed of the communication terminal apparatus, communication-carrier information of the mobile communication network, and communication information in the communication terminal apparatus.

* * * * *